US012041420B2

(12) United States Patent
Polinske et al.

(10) Patent No.: US 12,041,420 B2
(45) Date of Patent: *Jul. 16, 2024

(54) ANTENNAS FOR STANDARD FIT HEARING ASSISTANCE DEVICES

(71) Applicant: Starkey Laboratories, Inc., Eden Prairie, MN (US)

(72) Inventors: Beau Jay Polinske, Minneapolis, MN (US); Jorge F. Sanguino, Hopkins, MN (US); Jay Rabel, Shorewood, MN (US); Jeffrey Paul Solum, Greenwood, MN (US); Michael Helgeson, New Richmond, WI (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,114

(22) Filed: Mar. 25, 2021

(65) Prior Publication Data

US 2021/0219076 A1 Jul. 15, 2021

Related U.S. Application Data

(63) Continuation of application No. 16/554,688, filed on Aug. 29, 2019, now Pat. No. 10,966,035, which is a (Continued)

(51) Int. Cl.
*H04R 25/00* (2006.01)

(52) U.S. Cl.
CPC ........... *H04R 25/554* (2013.01); *H04R 25/55* (2013.01); *H04R 25/60* (2013.01); *H04R 25/602* (2013.01);

(Continued)

(58) Field of Classification Search
CPC .... H04R 25/55; H04R 25/552; H04R 25/554; H04R 25/60; H04R 25/602; H04R 25/604;

(Continued)

(56) References Cited

U.S. PATENT DOCUMENTS 3,601,550 A 8/1971 Spracklen
5,390,254 A 2/1995 Adelman (Continued)

FOREIGN PATENT DOCUMENTS

DE 10236469 B3 2/2004
EP 0382675 A1 8/1990

(Continued)

OTHER PUBLICATIONS

U.S. Appl. No. 11/357,751 U.S. Pat. No. 7,593,538, filed Feb. 17, 2006, Antennas for Hearing Aids.

(Continued)

*Primary Examiner* — Huyen D Le

(74) *Attorney, Agent, or Firm* — Schwegman Lundberg & Woessner, P.A.

(57) ABSTRACT

An embodiment of a hearing assistance device comprises a housing, a power source, a radio circuit, an antenna and a transmission line. The radio circuit is within the housing and electrically connected to the power source. The antenna has an aperture, and the radio circuit is at least substantially within the aperture. The transmission line electrically connects to the antenna to the radio circuit. Various antenna embodiments include a flex circuit antenna.

20 Claims, 14 Drawing Sheets

Related U.S. Application Data continuation of application No. 15/463,975, filed on Mar. 20, 2017, now Pat. No. 10,425,748, which is a continuation of application No. 14/927,770, filed on Oct. 30, 2015, now Pat. No. 9,602,934, which is a continuation of application No. 14/031,906, filed on Sep. 19, 2013, now Pat. No. 9,179,227, which is a continuation of application No. 12/340,604, filed on Dec. 19, 2008, now Pat. No. 8,565,457.

(52) U.S. Cl.
CPC ......... *H04R 25/604* (2013.01); *H04R 25/609* (2019.05); *H04R 25/65* (2013.01); *H04R 25/658* (2013.01); *H04R 25/552* (2013.01); *H04R 2225/021* (2013.01); *H04R 2225/023* (2013.01); *H04R 2225/025* (2013.01); *H04R 2225/51* (2013.01); *H04R 2499/11* (2013.01); *Y10T 29/49572* (2015.01)

(58) Field of Classification Search
CPC .... H04R 25/609; H04R 25/65; H04R 25/658; H04R 2225/021; H04R 2225/023; H04R 2225/025; H04R 2225/51; H04R 2499/11; Y10T 29/49572; H01Q 1/273
See application file for complete search history.

(56) References Cited

U.S. PATENT DOCUMENTS 5,721,783 A 2/1998 Anderson
5,734,976 A 3/1998 Bartschi et al.
5,808,587 A 9/1998 Shima
5,842,115 A 11/1998 Dent
6,041,128 A 3/2000 Narisawa et al.
6,041,129 A 3/2000 Adelman
6,061,037 A 5/2000 Brouwers et al.
6,205,227 B1 3/2001 Mahoney et al.
6,249,256 B1 6/2001 Luxon et al.
6,281,854 B1 8/2001 Ohoka et al.
6,307,945 B1 10/2001 Hall
6,380,896 B1 4/2002 Berger et al.
6,449,461 B1 9/2002 Otten
6,456,720 B1 9/2002 Brimhall et al.
6,459,415 B1 10/2002 Pachal et al.
6,473,512 B1 10/2002 Juneau et al.
6,501,437 B1 12/2002 Gyorko et al.
6,546,109 B1 4/2003 Gnecco et al.
6,597,320 B2 7/2003 Maeda et al.
6,603,440 B2 8/2003 Howard
6,674,869 B2 1/2004 Paczkowski
6,724,901 B1 4/2004 Preuthun
6,865,279 B2 3/2005 Leedom
7,142,682 B2 11/2006 Mullenborn et al.
7,265,721 B2 9/2007 Shigehiro et al.
7,289,069 B2 10/2007 Ranta
7,315,290 B2 1/2008 Harada et al.
7,426,279 B2 9/2008 Cochran et al.
7,443,992 B2 10/2008 Fideler
7,450,078 B2 11/2008 Knudsen et al.
7,454,027 B2 11/2008 Sorensen
7,548,211 B2 6/2009 Platz
7,593,538 B2 * 9/2009 Polinske .................. H01Q 7/00 381/322
7,646,356 B2 * 1/2010 Adel ........................ H01Q 9/27 343/895
7,659,469 B2 2/2010 Belli
7,742,614 B2 * 6/2010 Christensen ......... H04R 25/602 320/108
7,777,681 B2 8/2010 Platz
7,859,469 B1 12/2010 Rosener et al.
7,881,486 B1 2/2011 Killion et al.
7,933,425 B2 * 4/2011 Niederdrank ........ H04R 25/558 381/328
8,073,173 B2 12/2011 Onodera
8,150,075 B2 4/2012 Abolfathi et al.
8,180,080 B2 5/2012 Polinske et al.
8,494,197 B2 7/2013 Polinske et al.
8,565,457 B2 10/2013 Polinske et al.
8,699,733 B2 4/2014 Polinske et al.
8,737,658 B2 5/2014 Helgeson et al.
9,167,360 B2 10/2015 Polinske et al.
9,179,227 B2 11/2015 Polinske et al.
9,264,826 B2 2/2016 Helgeson et al.
9,294,850 B2 3/2016 Polinske et al.
9,451,371 B2 9/2016 Polinske
9,554,219 B2 1/2017 Kvist
9,602,934 B2 3/2017 Sanguino et al.
9,729,979 B2 8/2017 Özden
9,743,199 B2 8/2017 Polinske et al.
10,142,747 B2 11/2018 Helgeson et al.
10,194,253 B2 1/2019 Polinske
10,425,748 B2 9/2019 Polinske et al.
10,966,035 B2 3/2021 Polinske et al.
2001/0007050 A1 7/2001 Adelman
2002/0000944 A1 1/2002 Sabet et al.
2002/0037756 A1 3/2002 Jacobs et al.
2002/0090099 A1 7/2002 Hwang
2003/0122713 A1 7/2003 Morris
2004/0027296 A1 2/2004 Gerber
2004/0028251 A1 2/2004 Kasztelan et al.
2004/0044382 A1 3/2004 Ibrahim
2004/0120540 A1 6/2004 Mullenborn et al.
2004/0176815 A1 9/2004 Janzig et al.
2004/0196190 A1 10/2004 Mendolia et al.
2005/0099341 A1 5/2005 Zhang et al.
2005/0100183 A1 5/2005 Ballisager et al.
2005/0244024 A1 11/2005 Fischer et al.
2005/0253711 A1 11/2005 Nelson
2006/0055531 A1 3/2006 Cook et al.
2006/0145931 A1 7/2006 Ranta
2006/0227989 A1 * 10/2006 Polinske .............. H01Q 1/2283 381/322
2007/0080889 A1 4/2007 Zhang
2007/0086610 A1 4/2007 Niederdrank
2007/0188402 A1 8/2007 Knudsen et al.
2007/0229369 A1 10/2007 Platz
2008/0056520 A1 3/2008 Christensen et al.
2008/0095387 A1 4/2008 Niederdrank et al.
2008/0150816 A1 6/2008 Rahola et al.
2008/0272980 A1 11/2008 Adel et al.
2008/0287084 A1 11/2008 Krebs et al.
2009/0041285 A1 2/2009 Parkins et al.
2009/0085819 A1 4/2009 Watanabe
2009/0136068 A1 5/2009 Koo et al.
2009/0214064 A1 8/2009 Wu et al.
2009/0226786 A1 9/2009 Selcuk et al.
2010/0020994 A1 1/2010 Christensen et al.
2010/0074461 A1 3/2010 Polinske
2010/0158291 A1 6/2010 Polinske et al.
2010/0158293 A1 6/2010 Polinske et al.
2010/0158294 A1 6/2010 Helgeson et al.
2010/0158295 A1 6/2010 Polinske et al.
2010/0171667 A1 7/2010 Knudsen
2010/0202639 A1 8/2010 Christensen et al.
2011/0117974 A1 5/2011 Spitalnik et al.
2011/0228947 A1 9/2011 Killion et al.
2012/0308058 A1 12/2012 Polinske
2014/0016806 A1 1/2014 Polinske
2014/0016807 A1 1/2014 Polinske et al.
2014/0307904 A1 10/2014 Polinske et al.
2014/0348362 A1 11/2014 Helgeson et al.
2015/0016646 A1 1/2015 Polinske et al.
2015/0030190 A1 * 1/2015 Rabel ..................... H04R 25/30 381/315
2015/0043763 A1 * 2/2015 Troelsen .............. H04R 25/554 343/718
2016/0050503 A1 * 2/2016 Naether ................. H04R 25/60 264/308
2016/0183013 A1 6/2016 Polinske et al.
2016/0192091 A1 6/2016 Polinske et al.
2016/0337767 A1 11/2016 Helgeson et al.
2016/0345109 A1 11/2016 Polinske et al.

(56) References Cited

U.S. PATENT DOCUMENTS

| | | | | |
|---|---|---|---|---|
| 2017/0070829 | A1 | 3/2017 | Polinske | |
| 2017/0134870 | A1 | 5/2017 | Helgeson et al. | |
| 2017/0230768 | A1 | 8/2017 | Polinske et al. | |
| 2019/0349694 | A1* | 11/2019 | Farmakidis | H04R 25/65 |
| 2020/0059741 | A1 | 2/2020 | Polinske et al. | |
| 2020/0280125 | A1* | 9/2020 | Hesselballe | H04R 25/60 |

FOREIGN PATENT DOCUMENTS

| | | | |
|---|---|---|---|
| EP | 0389559 | A1 | 10/1990 |
| EP | 424796 | A2 | 5/1991 |
| EP | 0594375 | A2 | 4/1994 |
| EP | 1250026 | A1 | 10/2002 |
| EP | 1389035 | A1 | 2/2004 |
| EP | 1460712 | A1 | 9/2004 |
| EP | 1587344 | A2 | 10/2005 |
| EP | 1851823 | B1 | 8/2006 |
| EP | 1708306 | A1 | 10/2006 |
| EP | 1821571 | A1 | 8/2007 |
| EP | 1708306 | B1 | 5/2012 |
| EP | 2200120 | B1 | 10/2013 |
| EP | 2200348 | B1 | 5/2014 |
| JP | 02300894 | A | 12/1990 |
| JP | 2002238098 | A | 8/2002 |
| JP | 2002238100 | A | 8/2002 |
| WO | WO-9213430 | A1 | 8/1992 |
| WO | WO-9306666 | A1 | 4/1993 |
| WO | WO-9731431 | A1 | 8/1997 |
| WO | WO-9949815 | A1 | 10/1999 |
| WO | WO-2001043497 | A1 | 6/2001 |
| WO | WO-0173864 | A2 | 10/2001 |
| WO | WO-0173865 | A2 | 10/2001 |
| WO | WO-0173868 | A2 | 10/2001 |
| WO | WO-0173870 | A2 | 10/2001 |
| WO | WO-0173883 | A2 | 10/2001 |
| WO | WO-0173957 | A2 | 10/2001 |
| WO | WO-2004093002 | A1 | 10/2004 |
| WO | WO-2008023860 | A1 | 2/2008 |

OTHER PUBLICATIONS

U.S. Appl. No. 12/550,821 U.S. Pat. No. 8,180,080, filed Aug. 31, 2009, Antennas for Hearing Aids.
U.S. Appl. No. 13/410,042, filed Mar. 1, 2012, Antennas for Hearing Aids.
U.S. Appl. No. 14/024,409 U.S. Pat. No. 9,451,371, filed Sep. 11, 2013, Antennas for Hearing Aids.
U.S. Appl. No. 15/269,315 U.S. Pat. No. 10,194,253, filed Sep. 19, 2016, Antennas for Hearing Aids.
U.S. Appl. No. 12/340,591 U.S. Pat. No. 8,737,658, filed Dec. 19, 2008, Three Dimensional Substrate for Hearing Assistance Devices.
U.S. Appl. No. 14/287,334 U.S. Pat. No. 9,264,826, filed May 27, 2014, Three Dimensional Substrate for Hearing Assistance Devices.
U.S. Appl. No. 15/043,800, filed Feb. 15, 2016, Three Dimensional Substrate for Hearing Assistance Devices.
U.S. Appl. No. 12/340,600 U.S. Pat. No. 8,494,197, filed Dec. 19, 2008, Antennas for Custom Fit Hearing Assistance Devices.
U.S. Appl. No. 13/948,040 U.S. Pat. No. 9,167,360, filed Jul. 22, 2013, Antennas for Custom Fit Hearing Assistance Devices.
U.S. Appl. No. 14/886,629, filed Oct. 19, 2015, Antennas for Custom Fit Hearing Assistance Devices.
U.S. Appl. No. 14/031,906 U.S. Pat. No. 9,179,227, filed Sep. 19, 2013, Antennas for Standard Fit Hearing Assistance Devices.
U.S. Appl. No. 12/340,604 U.S. Pat. No. 8,565,457, filed Dec. 19, 2008, Antennas for Standard Fit Hearing Assistance Devices.
U.S. Appl. No. 14/927,770 U.S. Pat. No. 9,602,934, filed Oct. 30, 2015, Antennas for Standard Fit Hearing Assistance Devices.
U.S. Appl. No. 15/463,975 U.S. Pat. No. 10,425,748, filed Mar. 20, 2017, Antennas for Standard Fit Hearing Assistance Devices.
U.S. Appl. No. 16/554,688 U.S. Pat. No. 10,966,035, filed Aug. 29, 2019, Antennas for Standard Fit Hearing Assistance Devices.
U.S. Appl. No. 12/638,720 U.S. Pat. No. 8,699,733, filed Dec. 15, 2009, Parallel Antennas for Standard Fit Hearing Assistance Devices.
U.S. Appl. No. 14/252,398 U.S. Pat. No. 9,294,850, filed Apr. 14, 2014, Parallel Antennas for Standard Fit Hearing Assistance Devices.
U.S. Appl. No. 15/076,479 U.S. Pat. No. 9,743,199, filed Mar. 21, 2016, Parallel Antennas for Standard Fit Hearing Assistance Devices.
U.S. Appl. No. 15/413,176 U.S. Pat. No. 10,142,747, filed Jan. 23, 2017, Three Dimensional Substrate for Hearing Assistance Devices.
U.S. Appl. No. 16/199,814, filed Nov. 26, 2018, Three Dimensional Substrate for Hearing Assistance Devices.
"U.S. Appl. No. 15/463,975, Amendment Under 37 C.F.R. § 1.312 filed Jul. 9, 2019", 3 pgs.
"U.S. Appl. No. 11/357,751, Final Office Action dated Feb. 17, 2009", 11 pgs.
"U.S. Appl. No. 11/357,751, Non-Final Office Action dated May 23, 2008", 9 pgs.
"U.S. Appl. No. 11/357,751, Non-Final Office Action dated Aug. 28, 2007", 9 pgs.
"U.S. Appl. No. 11/357,751, Notice of Allowance dated Aug. 5, 2009", 7 pgs.
"U.S. Appl. No. 11/357,751, Preliminary Amendment dated Aug. 28, 2006", 6 pgs.
"U.S. Appl. No. 11/357,751, Response filed Feb. 28, 2008 to Non-Final Office Action dated Aug. 28, 2007", 10 pgs.
"U.S. Appl. No. 11/357,751, Response filed May 18, 2009 to Final Office Action dated Feb. 17, 2009", 9 pgs.
"U.S. Appl. No. 11/357,751, Response filed Nov. 24, 2008 to Non Final Office Action dated May 23, 2008", 13 pgs.
"U.S. Appl. No. 12/340,591, Final Office Action dated Mar. 14, 2012", 7 pgs.
"U.S. Appl. No. 12/340,591, Non Final Office Action dated Sep. 12, 2011", 7 pgs.
"U.S. Appl. No. 12/340,591, Notice of Allowance dated Jan. 21, 2014", 8 pgs.
"U.S. Appl. No. 12/340,591, Notice of Allowance dated Sep. 5, 2013", 9 pgs.
"U.S. Appl. No. 12/340,591, Response filed Jan. 12, 2012 to Non Final Office Action dated Sep. 12, 2011", 7 pgs.
"U.S. Appl. No. 12/340,591, Response filed Aug. 14, 2012 to Final Office Action dated Mar. 14, 2012", 11 pgs.
"U.S. Appl. No. 12/340,600, Final Office Action dated Mar. 27, 2012", 6 pgs.
"U.S. Appl. No. 12/340,600, Non Final Office Action dated Sep. 14, 2011", 6 pgs.
"U.S. Appl. No. 12/340,600, Notice of Allowance dated Mar. 19, 2013", 5 pgs.
"U.S. Appl. No. 12/340,600, Preliminary Amendment filed Apr. 6, 2009", 7 pgs.
"U.S. Appl. No. 12/340,600, Response filed Jan. 17, 2012 to Non Final Office Action dated Sep. 14, 2011", 10 pgs.
"U.S. Appl. No. 12/340,600, Response filed Aug. 27, 2012 to Final Office Action dated Mar. 27, 2012", 8 pgs.
"U.S. Appl. No. 12/340,604, 312 Amendment filed Sep. 19, 2013", 3 pgs.
"U.S. Appl. No. 12/340,604, Final Office Action dated Feb. 21, 2013", 17 pgs.
"U.S. Appl. No. 12/340,604, Final Office Action dated Mar. 1, 2012", 14 pgs.
"U.S. Appl. No. 12/340,604, Non Final Office Action dated Aug. 30, 2012", 15 pgs.
"U.S. Appl. No. 12/340,604, Non Final Office Action dated Oct. 11, 2011", 11 pgs.
"U.S. Appl. No. 12/340,604, Notice of Allowance dated Jun. 19, 2013", 18 pgs.
"U.S. Appl. No. 12/340,604, Preliminary Amendment filed Apr. 6, 2009", 7 pgs.
"U.S. Appl. No. 12/340,604, PTO Response to 312 Amendment dated Sep. 24, 2013", 2 pgs.
"U.S. Appl. No. 12/340,604, Response filed Jan. 11, 2012 to Non Final Office Action dated Oct. 11, 2011", 10 pgs.
"U.S. Appl. No. 12/340,604, Response filed May 21, 2013 to Final Office Action dated Feb. 21, 2013", 9 pgs.

(56) References Cited

OTHER PUBLICATIONS

"U.S. Appl. No. 12/340,604, Response filed Aug. 1, 2012 to Final Office Action dated Mar. 1, 2012", 9 pgs.
"U.S. Appl. No. 12/340,604, Response filed Dec. 31, 2012 to Non Final Office Action dated Aug. 30, 2012", 8 pgs.
"U.S. Appl. No. 12/550,821, Non Final Office Action dated Sep. 1, 2011", 9 pgs.
"U.S. Appl. No. 12/550,821, Notice of Allowance dated Mar. 19, 2012", 9 pgs.
"U.S. Appl. No. 12/550,821, Notice of Allowance dated Apr. 10, 2012", 7 pgs.
"U.S. Appl. No. 12/550,821, Response filed Mar. 1, 2012 to Non Final Office Action dated Sep. 1, 2011", 6 pgs.
"U.S. Appl. No. 12/638,720, Final Office Action dated Mar. 2, 2012", 17 pgs.
"U.S. Appl. No. 12/638,720, Non Final Office Action dated Jul. 30, 2013", 23 pgs.
"U.S. Appl. No. 12/638,720, Non Final Office Action dated Oct. 17, 2011", 14 pgs.
"U.S. Appl. No. 12/638,720, Notice of Allowance dated Nov. 27, 2013", 17 pgs.
"U.S. Appl. No. 12/638,720, Response filed Jan. 17, 2012 to Non Final Office Action dated Oct. 17, 2011", 9 pgs.
"U.S. Appl. No. 12/638,720, Response filed Aug. 1, 2012 to Final Office Action dated Mar. 2, 2012", 9 pgs.
"U.S. Appl. No. 12/638,720, Response filed Oct. 30, 2013 to Non Final Office Action dated Jul. 30, 2013", 10 pgs.
"U.S. Appl. No. 12/638,720, Supplemental Notice of Allowability dated Feb. 4, 2014", 2 pgs.
"U.S. Appl. No. 13/410,042, Non Final Office Action dated Apr. 11, 2013", 10 pgs.
"U.S. Appl. No. 13/948,040, Non Final Office Action dated Dec. 10, 2014", 8 pgs.
"U.S. Appl. No. 13/948,040, Notice of Allowance dated May 28, 2015", 7 pgs.
"U.S. Appl. No. 13/948,040, Preliminary Amendment filed Mar. 13, 2014", (Mar. 13, 2014), 6 pgs.
"U.S. Appl. No. 13/948,040, Response filed Mar. 10, 2015 to Non Final Office Action dated Dec. 10, 2014", 9 pgs.
"U.S. Appl. No. 14/024,409, Advisory Action dated Dec. 31, 2015", 3 pgs.
"U.S. Appl. No. 14/024,409, Final Office Action dated Oct. 1, 2015", 12 pgs.
"U.S. Appl. No. 14/024,409, Non Final Office Action dated Jan. 22, 2015", 8 pgs.
"U.S. Appl. No. 14/024,409, Notice of Allowance dated May 23, 2016", 7 pgs.
"U.S. Appl. No. 14/024,409, Pre-Appeal Brief filed Feb. 1, 2016", 3 pgs.
"U.S. Appl. No. 14/024,409, Response filed Jun. 22, 2015 to Non Final Office Action dated Jan. 22, 2015", 6 pgs.
"U.S. Appl. No. 14/024,409, Response filed Dec. 1, 2015 to Final Office Action dated Oct. 1, 2015", 8 pgs.
"U.S. Appl. No. 14/031,906, Advisory Action dated May 20, 2015", 3 pgs.
"U.S. Appl. No. 14/031,906, Final Office Action dated Mar. 11, 2015", 8 pgs.
"U.S. Appl. No. 14/031,906, Non Final Office Action dated Jul. 31, 2014", 7 pgs.
"U.S. Appl. No. 14/031,906, Notice of Allowance dated Jun. 26, 2015", 6 pgs.
"U.S. Appl. No. 14/031,906, Preliminary Amendment filed Sep. 20, 2013", (Sep. 20, 2013), 20 pgs.
"U.S. Appl. No. 14/031,906, Response filed May 11, 2015 to Final Office Action dated Mar. 11, 2015", 6 pgs.
"U.S. Appl. No. 14/031,906, Response filed Oct. 30, 2014 to Non Final Office Action dated Jul. 31, 2014", 6 pgs.
"U.S. Appl. No. 14/252,398, Final Office Action dated Aug. 11, 2015", 6 pgs.
"U.S. Appl. No. 14/252,398, Non Final Office Action dated Mar. 5, 2015", 10 pgs.
"U.S. Appl. No. 14/252,398, Notice of Allowance dated Nov. 10, 2015", 6 pgs.
"U.S. Appl. No. 14/252,398, Preliminary Amendment filed Oct. 6, 2014", 5 pgs.
"U.S. Appl. No. 14/252,398, Response filed Jun. 5, 2015 to Non Final Office Action dated Mar. 5, 2015", 7 pgs.
"U.S. Appl. No. 14/252,398, Response filed Oct. 12, 2015 to Final Office Action dated Aug. 11, 2015", 6 pgs.
"U.S. Appl. No. 14/287,334, Final Office Action dated Jul. 30, 2015", 4 pgs.
"U.S. Appl. No. 14/287,334, Non Final Office Action dated Mar. 12, 2015", 8 pgs.
"U.S. Appl. No. 14/287,334, Notice of Allowance dated Oct. 13, 2015", 6 pgs.
"U.S. Appl. No. 14/287,334, Preliminary Amendment filed Aug. 11, 2014", 6 pgs.
"U.S. Appl. No. 14/287,334, Response filed Jan. 10, 2014 to Restriction Requirement dated Nov. 13, 2014", 6 pgs.
"U.S. Appl. No. 14/287,334, Response filed Jun. 12, 2015 to Non Final Office Action dated Mar. 12, 2015", 9 pgs.
"U.S. Appl. No. 14/287,334, Response filed Sep. 30, 2015 to Final Office Action dated Jul. 30, 2015", 4 pgs.
"U.S. Appl. No. 14/287,334, Restriction Requirement dated Nov. 13, 2014", 6 pgs.
"U.S. Appl. No. 14/886,629, Non Final Office Action dated Dec. 28, 2016", 7 pgs.
"U.S. Appl. No. 14/927,770, Non Final Office Action dated Apr. 22, 2016", 9 pgs.
"U.S. Appl. No. 14/927,770, Notice of Allowance dated Nov. 8, 2016", 7 pgs.
"U.S. Appl. No. 14/927,770, Response filed Jul. 20, 2016 to Non Final Office Action dated Apr. 22, 2016", 6 pgs.
"U.S. Appl. No. 15/043,800, Non Final Office Action dated Sep. 23, 2016", 9 pgs.
"U.S. Appl. No. 15/076,479, Corrected Notice of Allowance dated Jul. 25, 2017", 2 pgs.
"U.S. Appl. No. 15/076,479, Final Office Action dated Jan. 17, 2017", 6 pgs.
"U.S. Appl. No. 15/076,479, Non Final Office Action dated Sep. 2, 2016", 8 pgs.
"U.S. Appl. No. 15/076,479, Notice of Allowance dated Apr. 14, 2017", 8 pgs.
"U.S. Appl. No. 15/076,479, Response Filed Mar. 6, 2017 to Final Office Action dated Jan. 17, 2017", 6 pgs.
"U.S. Appl. No. 15/076,479, Response Filed Dec. 1, 2016 to Non Final Office Action dated Sep. 2, 2016", 7 pgs.
"U.S. Appl. No. 15/269,315, Advisory Action dated May 17, 2018", 3 pgs.
"U.S. Appl. No. 15/269,315, Final Office Action dated Feb. 16, 2018", 24 pgs.
"U.S. Appl. No. 15/269,315, Non Final Office Action dated Aug. 4, 2017", 19 pgs.
"U.S. Appl. No. 15/269,315, Notice of Allowance dated Sep. 19, 2018", 11 pgs.
"U.S. Appl. No. 15/269,315, Preliminary Amendment filed Nov. 29, 2016", 5 pgs.
"U.S. Appl. No. 15/269,315, Response Filed Apr. 16, 2018 to Final Office Action dated Feb. 16, 2018", 8 pgs.
"U.S. Appl. No. 15/269,315, Response filed Nov. 6, 2017 to Non Final Office Action dated Aug. 4, 2017", 8 pgs.
"U.S. Appl. No. 15/413,176, Non Final Office Action dated Jan. 10, 2018", 11 pgs.
"U.S. Appl. No. 15/413,176, Notice of Allowance dated Jul. 26, 2018", 5 pgs.
"U.S. Appl. No. 15/413,176, Response File Jul. 10, 2018 to Non Final Office Action dated Jan. 10, 2018", 5 pgs.
"U.S. Appl. No. 15/463,975 Preliminary Amendment filed Apr. 28, 2017", 5 pgs.
"U.S. Appl. No. 15/463,975, 312 Amendment filed Jul. 9, 2019", 3 pgs.

(56) References Cited

OTHER PUBLICATIONS

"U.S. Appl. No. 15/463,975, Advisory Action dated Jun. 26, 2018", 3 pgs.
"U.S. Appl. No. 15/463,975, Corrected Notice of Allowability dated May 8, 2019", 2 pgs.
"U.S. Appl. No. 15/463,975, Final Office Action dated Feb. 19, 2019", 7 pgs.
"U.S. Appl. No. 15/463,975, Final Office Action dated Apr. 13, 2018", 12 pgs.
"U.S. Appl. No. 15/463,975, Non Final Office Action dated Aug. 9, 2018", 12 pgs.
"U.S. Appl. No. 15/463,975, Non Final Office Action dated Sep. 19, 2017", 11 pgs.
"U.S. Appl. No. 15/463,975, Notice of Allowance dated Apr. 22, 2019", 5 pgs.
"U.S. Appl. No. 15/463,975, PTO Response to Rule 312 Communication dated Jul. 22, 2019", 2 pgs.
"U.S. Appl. No. 15/463,975, Response Filed Apr. 2, 2019 to Final Office Action dated Feb. 19, 2019", 6 pgs.
"U.S. Appl. No. 15/463,975, Response Filed Jun. 6, 2018 to Final Office Action dated Apr. 13, 2018", 7 pgs.
"U.S. Appl. No. 15/463,975, Response Filed Nov. 6, 2018 to Non Final Office Action dated Aug. 9, 2018", 8 pgs.
"U.S. Appl. No. 15/463,975, Response filed Dec. 19, 2017 to Non Final Office Action dated Sep. 19, 2017", 7 pgs.
"U.S. Appl. No. 16/554,688, Non Final Office Action dated Jul. 21, 2020", 13 pgs.
"U.S. Appl. No. 16/554,688, Notice of Allowance dated Nov. 24, 2020", 5 pgs.
"U.S. Appl. No. 16/554,688, Preliminary Amendment filed Nov. 12, 2019", 5 pgs.
"U.S. Appl. No. 16/554,688, Response filed Oct. 16, 2020 to Non Final Office Action dated Jul. 21, 2020", 9 pgs.
"European Application Serial No. 06251644.8, European Office Action dated Mar. 11, 2008", 4 pgs.
"European Application Serial No. 06251644.8, European Search Report dated Jun. 21, 2006", 5 pgs.
"European Application Serial No. 06251644.8, Office Action dated May 11, 2007", 1 pg.
"European Application Serial No. 06251644.8, Response filed Sep. 22, 2008 to Office Action dated Mar. 11, 2008", 3 pgs.
"European Application Serial No. 06251644.8, Response filed Nov. 21, 2007 to Office Action dated May 11, 2007", 44 pgs.
"European Application Serial No. 06251644.8, Search Report dated Jun. 15, 2006", 2 pgs.
"European Application Serial No. 06251644.8, Summon to attend Oral Proceeding mailed Mar. 15, 2011", 4 pgs.
"European Application Serial No. 06251644.8, Written Submissions filed Jun. 1, 2011 in response to Summon to attend Oral Proceeding mailed Mar. 15, 2011", 25 pgs.
"European Application Serial No. 09252775.3, Examination Notification dated Jan. 22, 2013".
"European Application Serial No. 09252775.3, Extended European Search Report dated Apr. 19, 2010", 6 pgs.
"European Application Serial No. 09252775.3, Response filed May 28, 2013 to Examination Notification Art. 94(3) dated Jan. 22, 2013", 12 pgs.
"European Application Serial No. 09252775.3, Response filed Dec. 22, 2010 to Search Report dated Apr. 23, 2010", 14 pgs.
"European Application Serial No. 09252796.9, Examination Notification Art. 94(3) dated Mar. 13, 2013", 4 pgs.
"European Application Serial No. 09252796.9, Extended European Search Report dated May 24, 2011", 6 Pgs.
"European Application Serial No. 09252796.9, Response filed Jul. 4, 2013 to Office Action dated Mar. 13, 2013", 9 pgs.
"European Application Serial No. 09252796.9, Response filed Dec. 14, 2011 to Search Report dated Jun. 28, 2011", 7 pgs.
"European Application Serial No. 09252830.6, Extended European Search Report dated May 24, 2011", 6 pgs.
"European Application Serial No. 09252830.6, Extended Search Report Response filed Dec. 15, 2011", 9 pgs.
Chen, W T, et al., "Numerical computation of the EM coupling between a circular loop antenna and a full-scale human-body model", IEEE Transactions on Microwave Theory and Techniques, 46(10), (Oct. 1998), 1516-1520.
Huang, Yi, et al., "Antennas From Theory to Practice", John Wiley & Sons Ltd, The Atrium, Southern Gate, Chichester, West Sussex, PO19 8SQ, United Kingdom, (2008), 379 pgs.

* cited by examiner

ANTENNAS FOR STANDARD FIT HEARING ASSISTANCE DEVICES

RELATED APPLICATION

This application is a continuation of U.S. patent application Ser. No. 16/554,688, filed Aug. 29, 2019, now issued as U.S. Pat. No. 10,866,035, which is a continuation of U.S. patent application Ser. No. 15/463,975, filed Mar. 20, 2017, now issued as U.S. Pat. No. 10,425,748, which is a continuation of U.S. patent application Ser. No. 14/927,770, filed Oct. 30, 2015, now issued as U.S. Pat. No. 9,602,934, which is a continuation of U.S. patent application Ser. No. 14/031,906, filed Sep. 19, 2013, now issued as U.S. Pat. No. 9,179,227, which is a continuation of U.S. patent application Ser. No. 12/340,604, filed Dec. 19, 2008, now issued as U.S. Pat. No. 8,565,457, all of which are incorporated herein by reference in their entirety.

TECHNICAL FIELD

This application relates generally to antennas, and more particularly to antennas for hearing assistance devices.

BACKGROUND

Examples of hearing assistance devices, also referred to herein as hearing instruments, include both prescriptive devices and non-prescriptive devices. Examples of hearing assistance devices include, but are not limited to, hearing aids, headphones, assisted listening devices, and earbuds.

Hearing instruments can provide adjustable operational modes or characteristics that improve the performance of the hearing instrument for a specific person or in a specific environment. Some of the operational characteristics are volume control, tone control, and selective signal input. These and other operational characteristics can be programmed into a hearing aid. A programmable hearing aid can be programmed using wired or wireless communication technology.

Generally, hearing instruments are small and require extensive design to fit all the necessary electronic components into the hearing instrument or attached to the hearing instrument as is the case for an antenna for wireless communication with the hearing instrument. The complexity of the design depends on the size and type of hearing instrument. For completely-in-the-canal (CIC) hearing aids, the complexity can be more extensive than for in-the-ear (ITE) hearing aids, behind-the-ear (BTE) or on-the-ear (OTE) hearing aids due to the compact size required to fit completely in the ear canal of an individual.

Systems for wireless hearing instruments have been proposed, in which information is wirelessly communicated between hearing instruments or between a wireless accessory device and the hearing instrument. Due to the low power requirements of modern hearing instruments, the system has a minimum amount of power allocated to maintain reliable wireless communication links. Also the small size of modern hearing instruments requires unique solutions to the problem of housing an antenna for the wireless links. The better the antenna, the lower the power consumption of both the transmitter and receiver for a given link performance.

Both the CIC and ITE hearing instruments are custom fitted devices, as they are fitted and specially built for the wearer of the instrument. For example, a mold may be made of the user's ear or canal for use to build the custom instrument. In contrast, a standard instrument such as a BTE or OTE is designed to fit within the physiology of several wearers and is programmed for the person wearing the instrument to improve hearing for that person.

SUMMARY

An embodiment of a hearing assistance device comprises a housing, a power source, a radio circuit, an antenna and a transmission line. The radio circuit is within the housing and electrically connected to the power source. The antenna has an aperture, and the radio circuit is at least substantially within the aperture. The transmission line electrically connects to the antenna to the radio circuit. Various antenna embodiments include a flex circuit antenna.

According to an embodiment of a method of forming a hearing assistance device, a radio circuit is placed within a housing of the device, and a flex circuit is looped to form an aperture. The flex circuit is electrically connected to the radio circuit. The radio circuit is at least substantially within the aperture formed by the flex circuit.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIGS. 11A-10C illustrate an embodiment of a flex circuit for a multi-loop antenna.

DETAILED DESCRIPTION

Figure 1A:
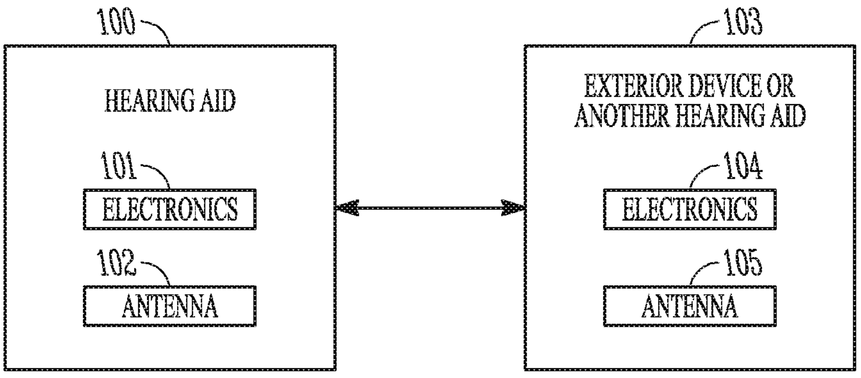
FIGS. 1A and 1B depict embodiments of a hearing instrument having electronics and an antenna for wireless communication with a device exterior to the hearing aid.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

A hearing aid is a hearing device that generally amplifies or processes sound to compensate for poor hearing and is typically worn by a hearing impaired individual. In some instances, the hearing aid is a hearing device that adjusts or modifies a frequency response to better match the frequency dependent hearing characteristics of a hearing impaired individual. Individuals may use hearing aids to receive audio data, such as digital audio data and voice messages wirelessly, which may not be available otherwise for those seriously hearing impaired.

Various embodiments include a single layer or multi-layer flex circuit with conductors that combine a transmission line and loop antenna for the purpose of conducting RF radiation to/from a radio to a radiating element within a standard hearing aid. According to some embodiments, the conductor surrounds the circuitry and/or power source (e.g. battery) within a standard hearing instrument such that the axis of the loop is parallel or orthogonal to the axis of symmetry of the device. Some embodiments incorporate an antenna with multiple polarizations by including more than one loop for RF current to flow.

An embodiment provides a single or multi-turn loop antenna that includes a single or multi-layer flex circuit conductor formed in the shape of a loop and contained within a BTE or OTE hearing instrument. The flex circuit has the combined function of both the radiating element (loop) and the transmission line for the purpose of conducting RF energy from a radio transmitter/receiver device to the antenna. In an embodiment, the antenna loop is parallel to the axis of symmetry of the body of the hearing instrument. In some embodiments, the antenna loop is perpendicular to the axis of symmetry of the body of the hearing instrument (e.g. wrapped around the body of the hearing instrument and the electronic circuitry within the hearing instrument). However this is not the only possible configuration or location within the instrument.

Some embodiments use a single or multi-turn loop antenna that includes a conductive metal formed in such a way as to fit around the circuitry and embedded within the plastic framework used in the construction of a hearing instrument. A transmission line connects the formed metal antenna to the radio inside the hearing instrument.

Figure 1B:
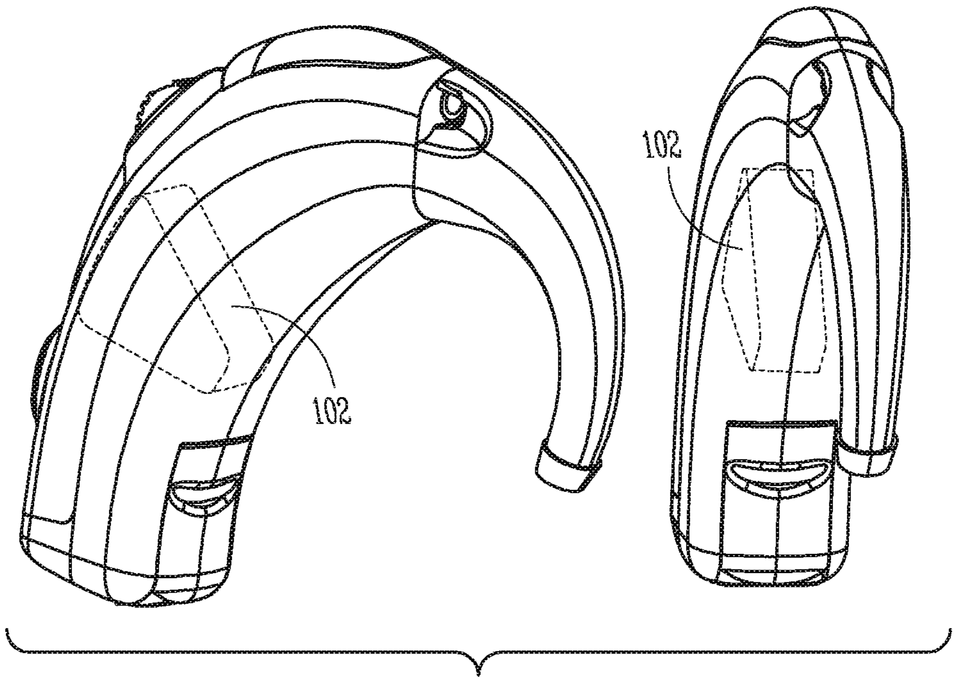

FIGS. 1A and 1B depict embodiments of a hearing instrument having electronics and an antenna for wireless communication with a device exterior to the hearing aid. FIG. 1A depicts an embodiment of a hearing aid 100 having electronics 101 and an antenna 102 for wireless communication with a device 103 exterior to the hearing aid. The exterior device 103 includes electronics 104 and an antenna 105 for communicating information with hearing aid 100. In an embodiment, the hearing aid 100 includes an antenna having a working distance ranging from about 2 meters to about 3 meters. In an embodiment, the hearing aid 100 includes an antenna having working distance ranging to about 10 meters. In an embodiment, the hearing aid 100 includes an antenna that operates at about −10 dBm of input power. In an embodiment, the hearing aid 100 includes an antenna operating at a carrier frequency ranging from about 400 MHz to about 3000 MHz. In an embodiment, the hearing aid 100 includes an antenna operating at a carrier frequency of about 916 MHz. In an embodiment, the hearing aid 100 includes an antenna operating at a carrier frequency of about 916 MHz with a working distance ranging from about 2 meters to about 3 meters for an input power of about −10 dBm. According to various embodiments, the carrier frequencies fall within an appropriate unlicensed band (e.g. ISM (Industrial Scientific and Medical) frequency band in the United States). For example, some embodiments operate within 902-928 MHz frequency range for compliance within the United States, and some embodiments operate within the 863-870 MHz frequency range for compliance within the European Union.

FIG. 1B illustrate two hearing aids 100 and 103 with wireless communication capabilities. In addition to the electronics (e.g. hybrid circuit) and antennas, the illustrated hearing aids include a microphone 132, and a receiver 127 within a shell or housing 128 of the hearing aid.

Figure 2A:
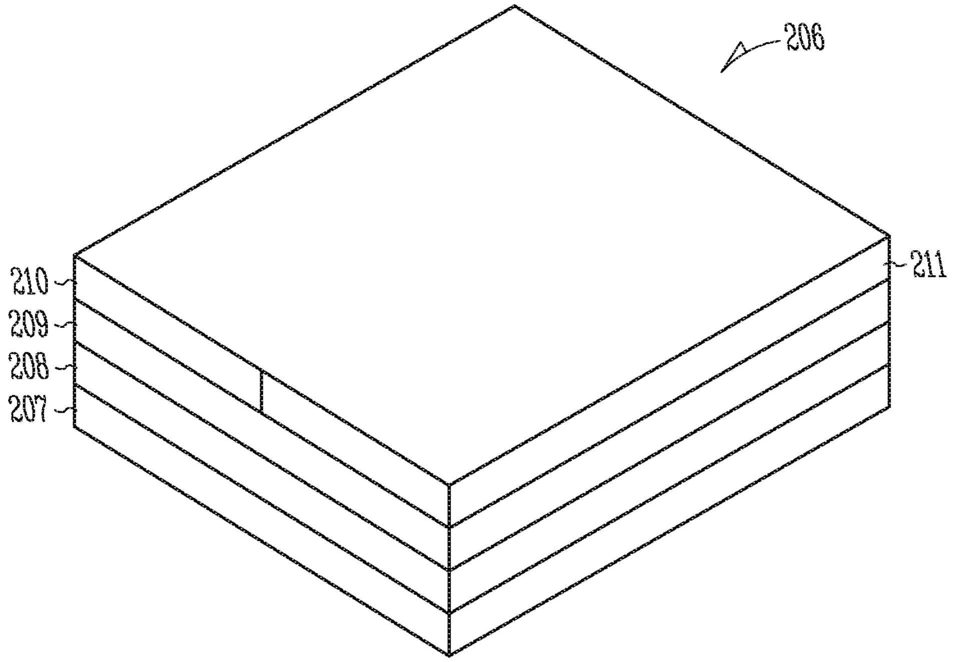
FIGS. 2A and 2B illustrate embodiments of a hybrid circuit, such as may provide the electronics for the hearing instruments of FIGS. 1A-1B.
Figure 2B:
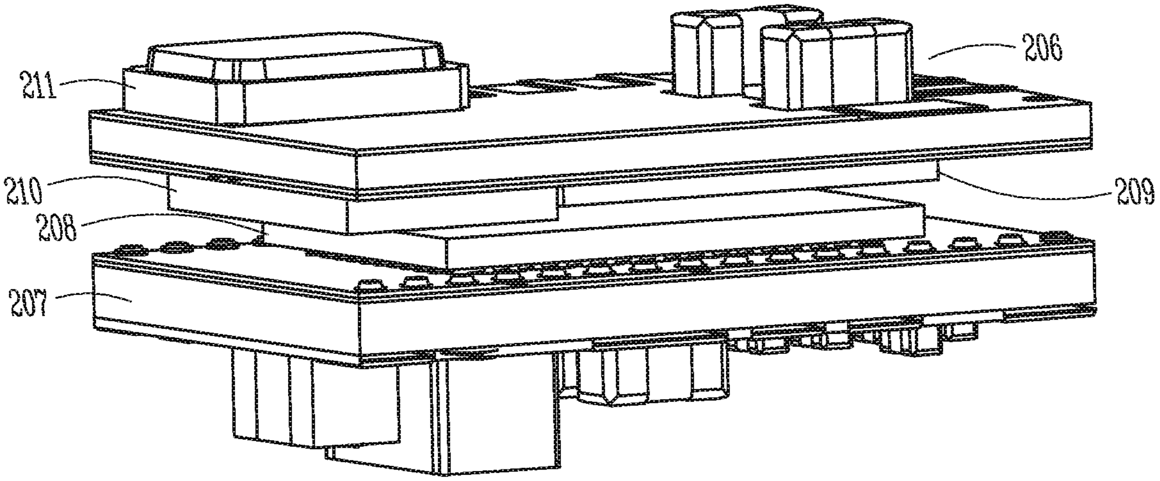

FIGS. 2A and 2B illustrate some embodiments of a hybrid circuit, such as may provide the electronics for the hearing instruments of FIGS. 1A-1B. In general, a hybrid circuit is a collection of electronic components and one or more substrates bonded together, where the electronic components include one or more semiconductor circuits. In some cases, the elements of the hybrid circuit are seamlessly bonded together. In various embodiments, the substrate has a dielectric constant less than 3 or a dielectric constant greater than 10. In an embodiment, substrate is a quartz substrate. In an embodiment, the substrate is a ceramic substrate. In an embodiment, the substrate is an alumina substrate. In an embodiment, the substrate has a dielectric constant ranging from about 3 to about 10.

Hybrid circuit 206 includes a foundation substrate 207, a hearing aid processing layer 208, a device layer 209 containing memory devices, and a layer having a radio frequency (RF) chip 210 and a crystal 211. The crystal 211 may be shifted to another location in hybrid circuit and replaced with a surface acoustic wave (SAW) device. The SAW device, such as a SAW filter, may be used to screen or filter out noise in frequencies that are close to the wireless operating frequency.

The hearing aid processing layer 208 and device layer 209 provide the electronics for signal processing, memory storage, and sound amplification for the hearing aid. In an embodiment, the amplifier and other electronics for a hearing may be housed in a hybrid circuit using additional layers or using less layers depending on the design of the hybrid circuit for a given hearing aid application. In an embodiment, electronic devices may be formed in the substrate containing the antenna circuit. The electronic devices may include one or more application specific integrated circuits (ASICs) designed to include a matching circuit to couple to the antenna or antenna circuit.

Figure 3:
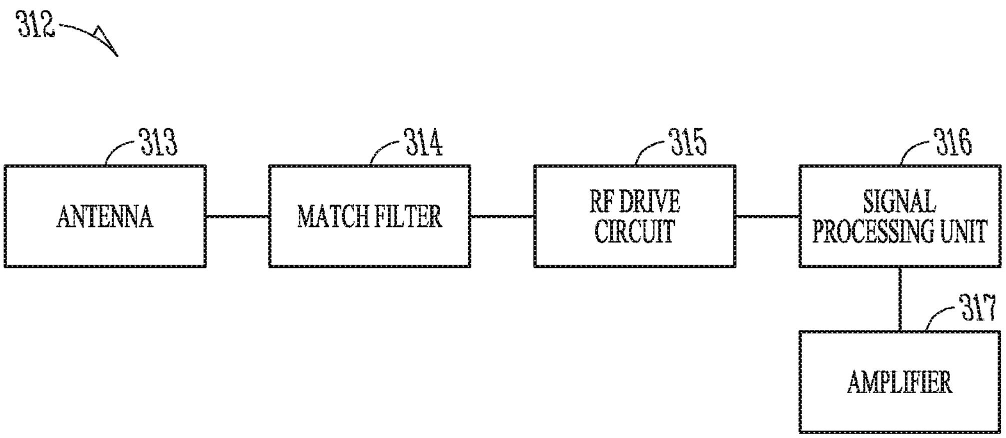
FIG. 3 shows a block diagram of an embodiment of a circuit configured for use with other components in a hearing instrument.

FIG. 3 shows a block diagram of an embodiment of a circuit 312 configured for use with other components in a hearing instrument. The hearing instrument may include a microphone, a power source or other sensors and switches not illustrated in FIG. 3. The illustrated circuit 312 includes an antenna 313, a match filter 314, an RF drive circuit 315, a signal processing unit 316, and an amplifier 317. The match filter 314, RF drive circuit 315, signal processing unit 316, and amplifier 317 can be distributed among the layers of the hybrid circuit illustrated in FIGS. 2A-2B, for example. The match filter 314 provides for matching the complex impedance of the antenna to the impedance of the RF drive circuit 315. The signal processing unit 316 provides the electronic circuitry for processing received signals via the antenna 313 for wireless communication between the hearing aid and a source external to the hearing aid. The source external to the hearing instrument can be used to transfer information for testing and programming of the hearing instrument. The signal processing unit 316 may also provide the processing of signals representing sounds, whether received as acoustic signals or electromagnetic signals. The signal processing unit 316 provides an output that is increased by the amplifier 317 to a level which allows sounds to be audible to the hearing aid user. The amplifier 317 may be realized as an integral part of the signal processing unit 316.

As can be appreciated by those skilled in the art upon reading and studying this disclosure, the elements of a hearing instrument housed in a hybrid circuit that includes an integrated antenna can be configured in various formats relative to each other for operation of the hearing instrument.

Figure 4:
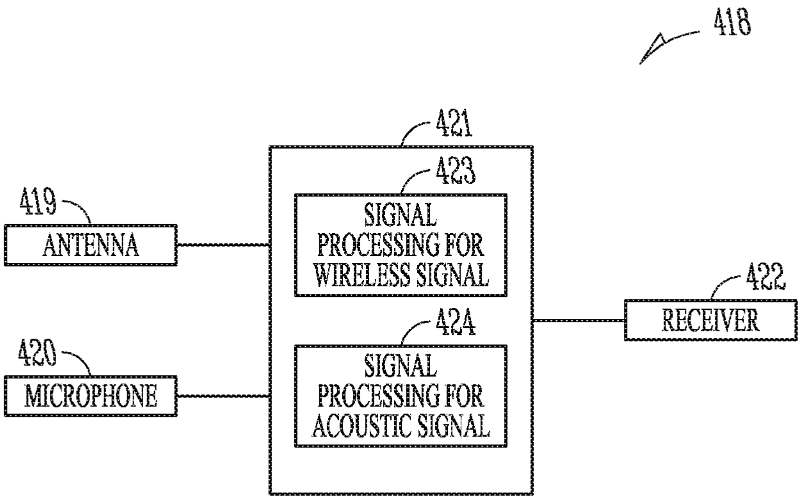
FIG. 4 illustrates a block diagram for a hearing assistance device, according to various embodiments.

FIG. 4 illustrates a block diagram for a hearing assistance device, according to various embodiments. An example of a hearing assistance device is a hearing aid. The illustrated device 418 includes an antenna 419 according to various embodiments described herein, a microphone 420, signal processing electronics 421, and a receiver 422. The illustrated signal processing electronics 421 includes signal processing electronics 423 to process the wireless signal received or transmitted using the antenna. The illustrated signal processing electronics 421 further include signal processing electronics 424 to process the acoustic signal received by the microphone. The signal processing electronics 421 is adapted to present a signal representative of a sound to the receiver (e.g. speaker) 422, which converts the signal into sound for the wearer of the device 418.

Various embodiments incorporate a flex circuit antenna, also referred to as a flex antenna. A flex antenna uses a flex circuit, which is a type of circuitry that is flexible. The flexibility is provided by forming the circuit as thin conductive traces in a thin flexible medium such as a polymeric material or other flexible dielectric material. The flex antenna includes flexible conductive traces on a flexible dielectric layer. In an embodiment, the flex antenna is disposed on substrate on a single plane or layer. In an embodiment, the antenna is configured as a flex circuit having thin metallic traces in a polyimide substrate. Such a flex design may be realized with an antenna layer or antenna layers of the order of about 0.003 inch thick. A flex design may be realized with a thickness of about 0.006 inches. Such a flex design may be realized with antenna layers of the order of about 0.004 inch thick. A flex design may be realized with a thickness of about 0.007 inches as one or multiple layers. Other thicknesses may be used without departing from the scope of the present subject matter. The dielectric layer of a flex antenna is a flexible dielectric material that provides insulation for the conductive layer. In an embodiment, the dielectric layer is a polyimide material. In an embodiment for a flex antenna, a thin conductive layer is formed in or on a thin dielectric layer, where the dielectric layer has a width slightly larger than the width of conductive layer for configuration as an antenna. An embodiment uses copper for the metal, and some embodiments plate the copper with silver or nickel or gold. Some embodiments provide a copper layer on each side of a coverlay (e.g. polyimide). The thickness of a flex circuit will typically be smaller than a hard metal circuit, which allows for smaller designs. Additionally, the flexible nature of the flex circuit makes the fabrication of the device easier.

According to various embodiments, the flex circuit is used to form an antenna loop, and some embodiments integrally form transmission lines with the antenna loop. The flat design of the antenna promotes a desired current density by providing the flat surface of the antenna parallel with an axis of a loop of the antenna.

A design goal to increase quality for an antenna is to increase the aperture size of the antenna loop, and another design goal is to decrease the loss of the antenna. Magnetic material (e.g. iron) and electrical conductors within the loop increase loss. Separation between the magnetic material and the antenna decreases the amount of the loss. Various embodiments maintain separation between the antenna and the battery and electrical conductors to reduce the amount of loss.

Figure 5A:
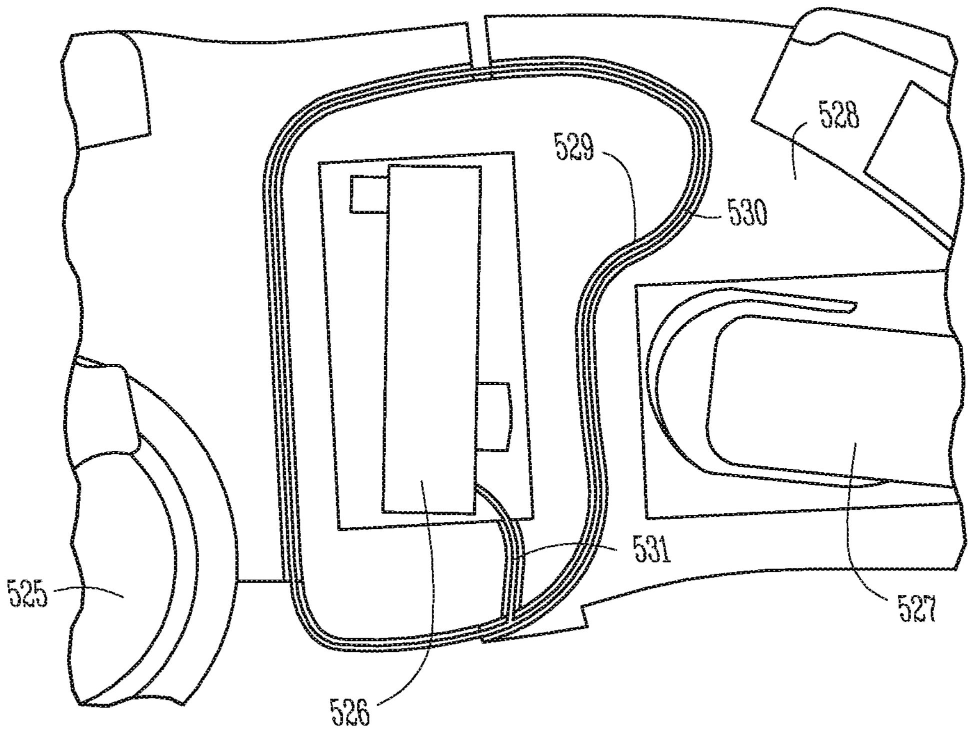
FIGS. 5A-5D illustrate an embodiment of a flex circuit antenna with integrated flexible transmission line forming a loop in a plane parallel to a long axis for a standard hearing assistance device.
Figure 5B:
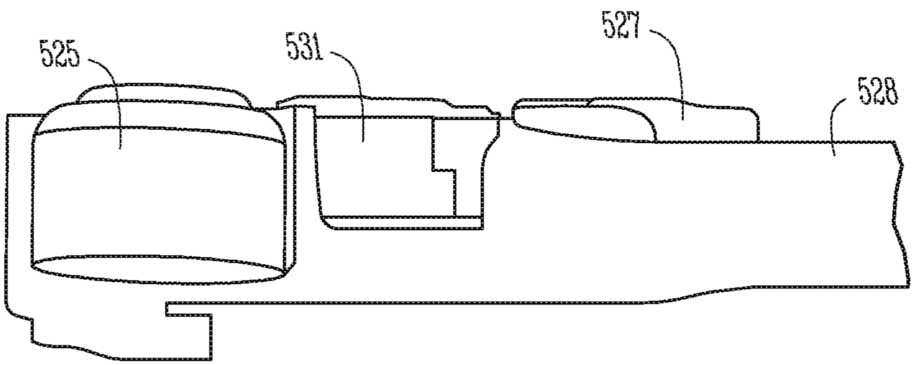
Figure 5C:
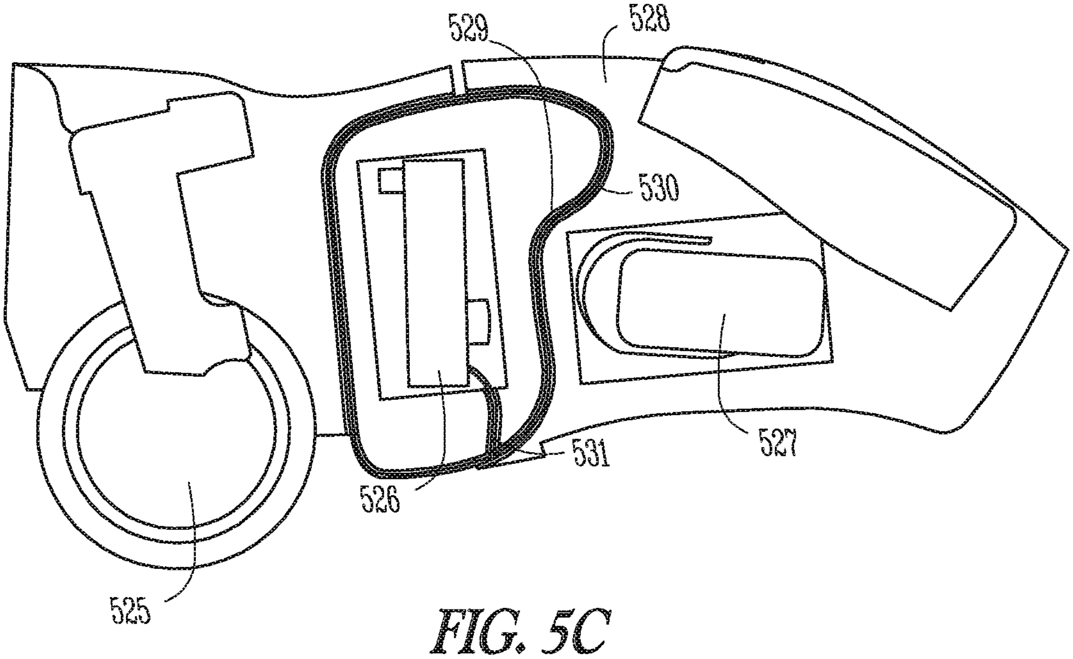
Figure 5D:
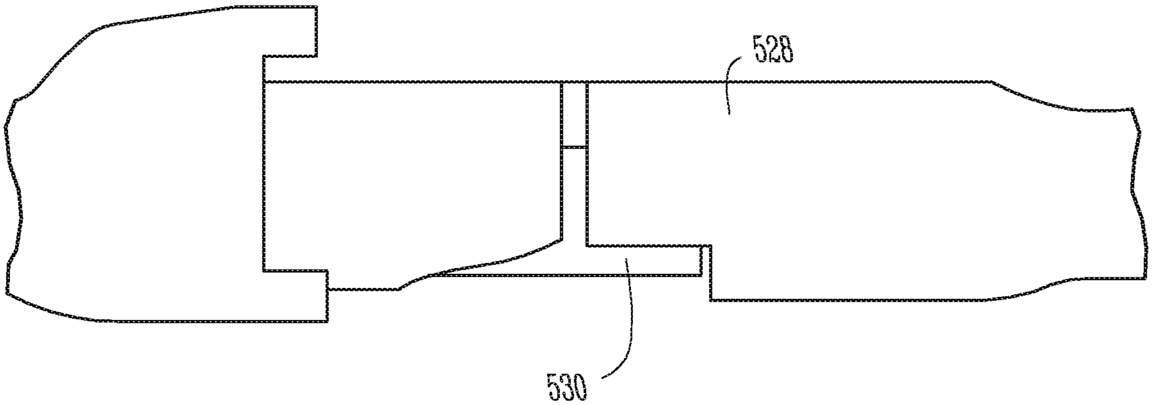

FIGS. 5A-5D illustrate an embodiment of a flex circuit antenna with integrated flexible transmission line forming a loop in a plane parallel to a long axis for a standard hearing assistance device. Examples of standard hearing assistance devices include BTE and OTE hearing aids. FIGS. 5A and 5C illustrates side views, and FIG. 5B illustrates a bottom view and FIG. 5D illustrates a top view. An OTE is a smaller version of a BTE. The illustrated device includes a battery 525, a radio hybrid circuit 526, a receiver (e.g. speaker) 527. According to various embodiments, the hybrid radio includes a radio, an EPROM, and a processor/digital signal processor (DSP). The illustrated device has a housing 528, and a groove 529 in the housing 528. A flex antenna 530 is received within the groove 529. A transmission line 531 connects the flex antenna 530 to the radio hybrid circuit 526. In the illustrated embodiment, the flex antenna 530 and the transmission line 531 are integrally formed as a flex circuit. Also, in the illustrated embodiment, the flex antenna 530 loops around the radio hybrid circuit.

Figure 6A:
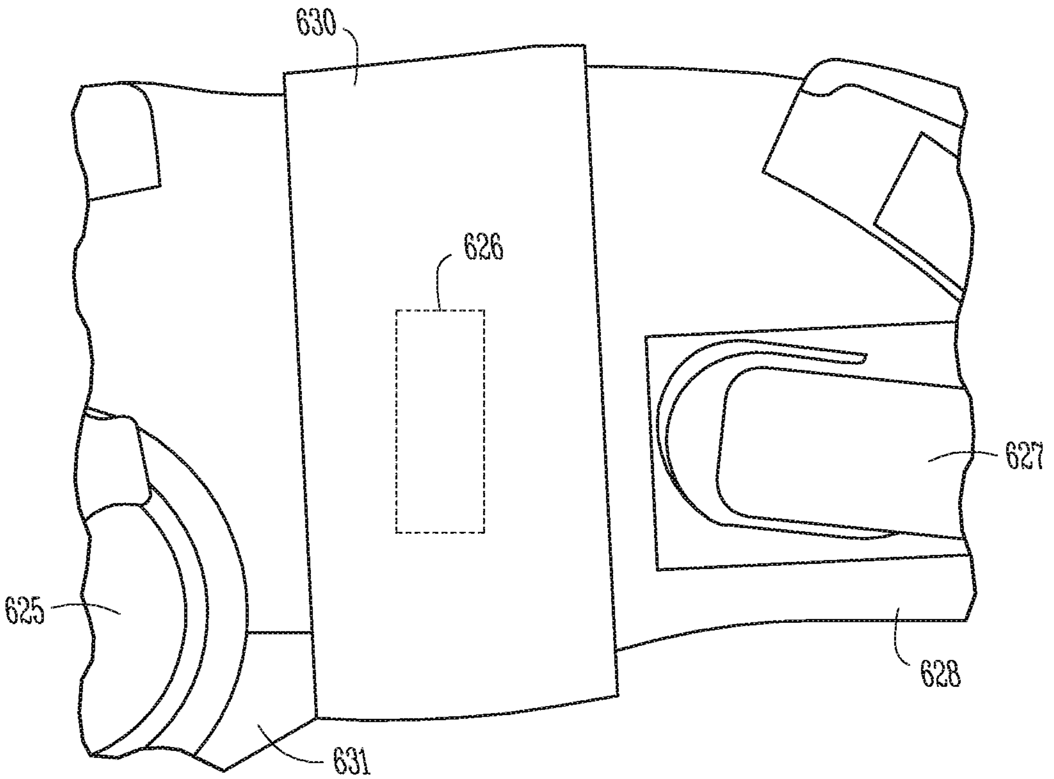
FIGS. 6A-6D illustrate an embodiment of a flex circuit antenna with integrated flexible transmission line forming a loop in a plane perpendicular to a long axis for a standard hearing assistance device.
Figure 6B:
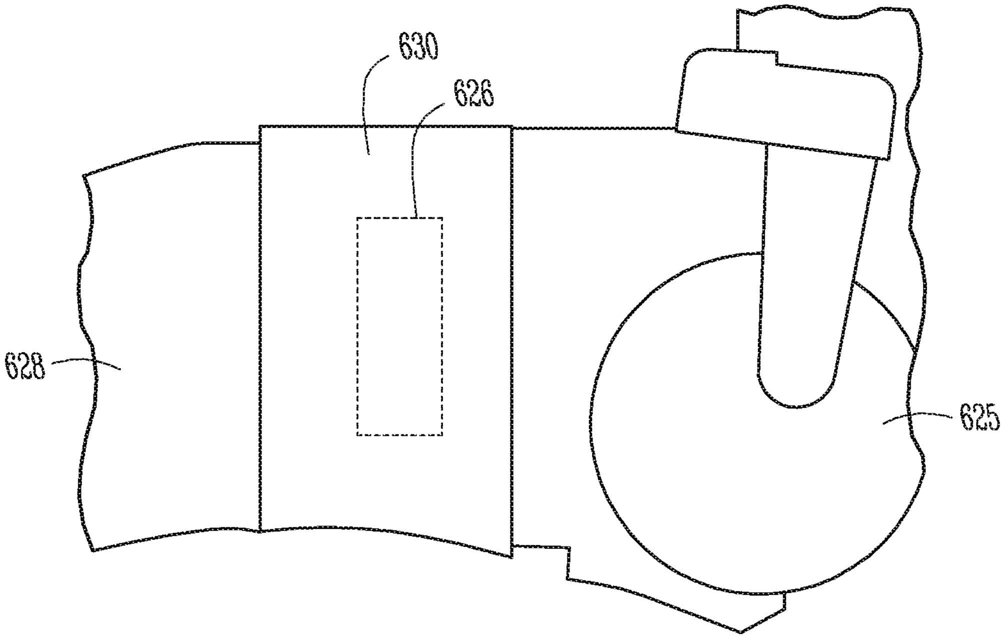
Figure 6C:
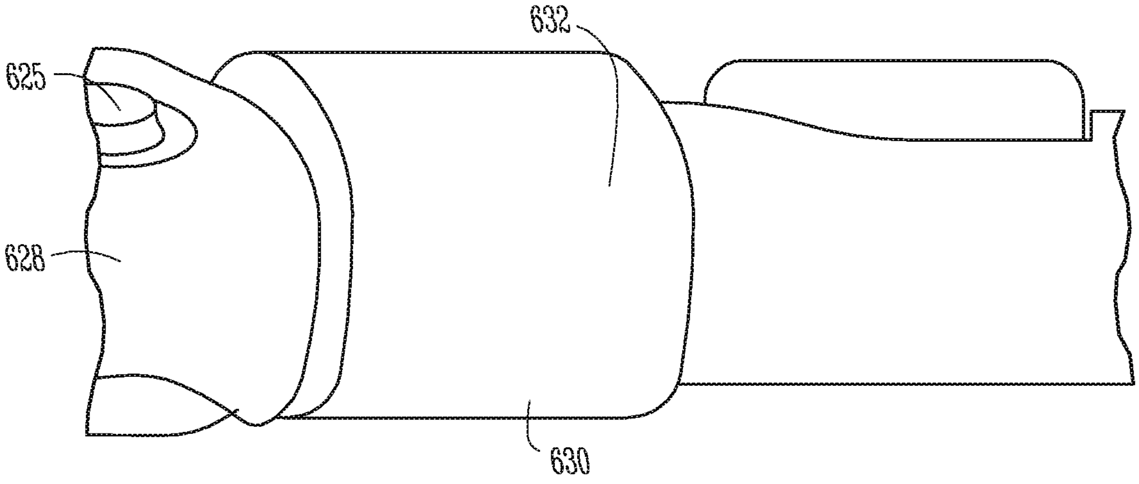
Figure 6D:
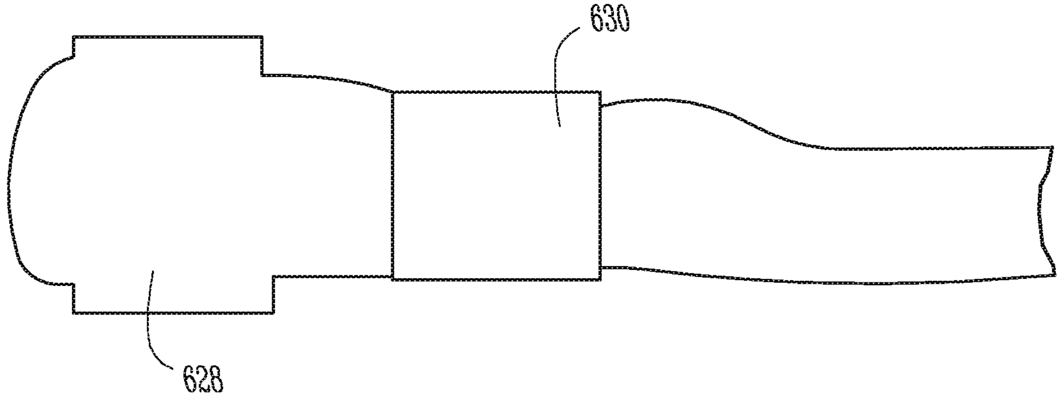

FIGS. 6A-6D illustrate an embodiment of a flex circuit antenna with flexible transmission line oriented orthogonal to the axis of symmetry for a standard hearing assistance device. FIGS. 6A-6B illustrated opposite side views of the device, FIG. 6C illustrates a bottom view and FIG. 6D illustrates a top view. The illustrated device includes a battery 625, a radio hybrid circuit 626 (illustrated hidden behind the antenna 530), a receiver (e.g. speaker) 627. The illustrated device has a housing 628. A flex antenna 630 is wrapped around the housing 628. Transmission lines 631 connect the flex antenna 630 to the radio hybrid circuit 626. In the illustrated embodiment, the flex antenna 630 and the transmission lines 631 are integrally formed as a flex circuit. Also, in the illustrated embodiment, the flex antenna 630 loops around the radio hybrid circuit 626. In the illustrated embodiment, ends of the flex antenna 630 are physically connected at seam 632 to fix the wrapped position around the housing 628, and are electrically connected to the radio hybrid circuit 626 through the transmission lines 631.

Figure 7A:
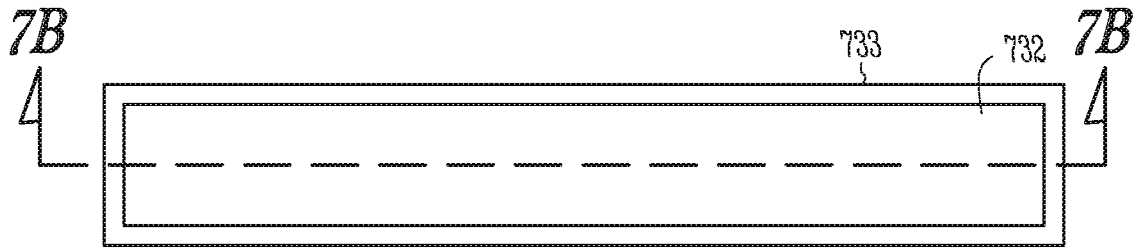
FIGS. 7A-7B illustrate an embodiment of flex circuit material with a single trace, such as may be used to form flex circuit antennas.
Figure 7B:
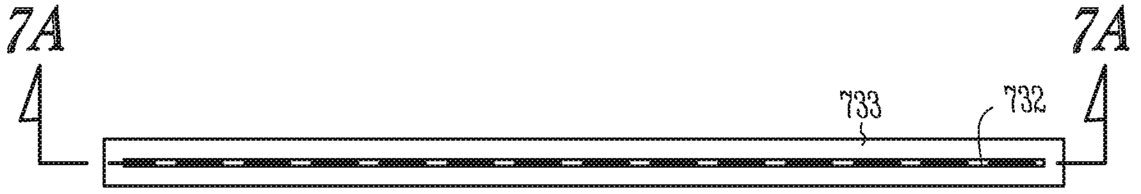

FIGS. 7A-7B illustrate an embodiment of flex circuit material with a single trace, such as may be used to form flex circuit antennas. In the illustrated embodiment, a thin conductor 732 is sandwiched between flexible dielectric material 733, such as a polyimide material. An embodiment uses copper for the thin conductor. Some embodiments plate the copper with silver or nickel or gold. The size and flexible nature of the flex circuit makes the fabrication of the device easier. Some flex circuit embodiments are designed with the appropriate materials and thicknesses to provide the flex circuit with a shape memory, as the flex circuit can be flexed but tends to return to its original shape. This shape memory embodiment may be used in designs where the antenna follows an inside surface of an outer shell of the hearing instrument, as the shape memory may bias the antenna against the outer shell. Some flex embodiments are designed with the appropriate materials and thicknesses to provide the flex circuit with shape resilience, as the flex circuit can be flexed into a shape and will tend to remain in that shape. Some embodiments integrate circuitry (e.g. match filter, RF drive circuit, signal processing unit, and/or amplifier) into the flex circuit.

Figure 8A:
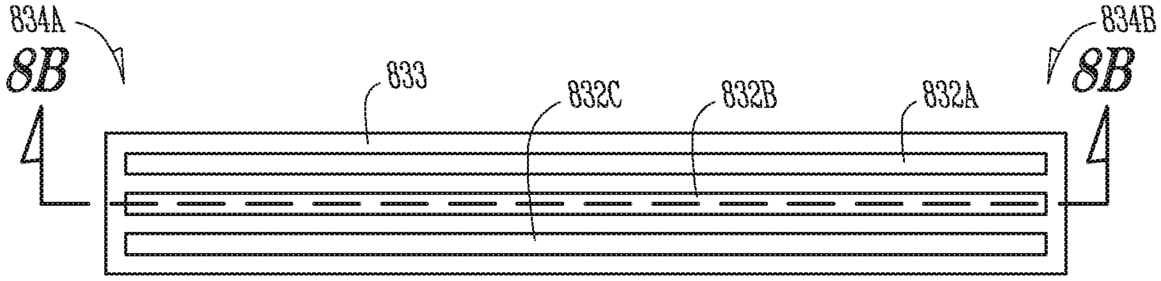
FIGS. 8A-8C illustrate an embodiment of flex circuit material with multiple traces, such as may be used to form flex circuit antennas.
Figure 8B:
Figure 8C:
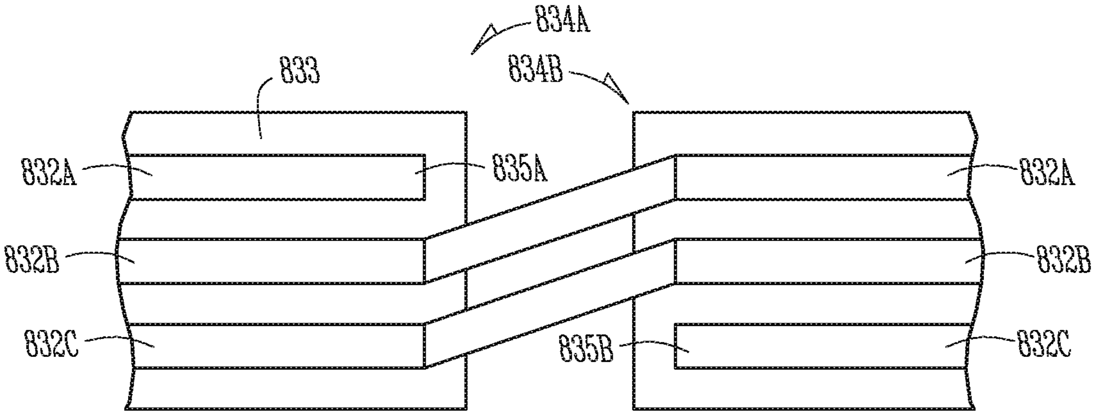

FIGS. 8A-8C illustrate an embodiment of flex circuit material with multiple traces, such as may be used to form flex circuit antennas. In the illustrated embodiment, multiple thin conductors 832A, 832B and 832C are sandwiched between flexible dielectric material 833, such as a polyimide material. When forming a loop or a substantial loop using the flex circuit, the first end 834A and the second end 834B are proximate to each other. The ends of the individual traces 832A-C can be soldered or otherwise connected together to form multiple loops of conductor within a single loop of a flex circuit. Contacts to transmission lines can be taken at 835A and 835B, or the flex circuit can be formed to provide integral transmission lines extending from 835A and 835B.

Figure 9A:
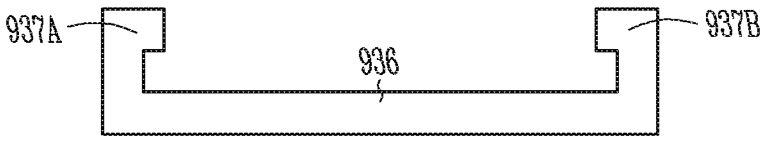
FIGS. 9A-9C illustrate an embodiment of a flex circuit for a single loop antenna.
Figure 9B:
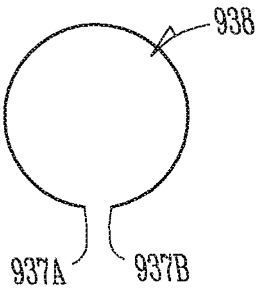
Figure 9C:
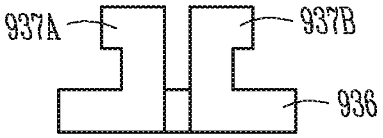

FIGS. 9A-9C illustrate an embodiment of a flex circuit for a single loop antenna. The illustrated embodiment includes an antenna portion 936 and integrated flexible transmission lines 937A-B. The transmission lines can have various configurations. The antenna can be flexed to form a single loop 938, as illustrated in FIGS. 9B-9C. The illustrated loop 938 has a general shape to wrap around width-wise either the inside or the outside surface of the outer shell of the hearing instrument. The loop can be configured to wrap length-wise around the device.

Figure 10A:
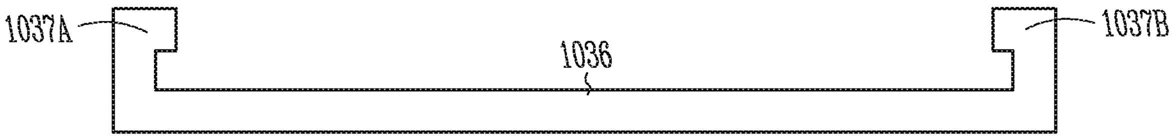
FIGS. 10A-10C illustrate an embodiment of a flex circuit for a multi-turn antenna.
Figure 10B:
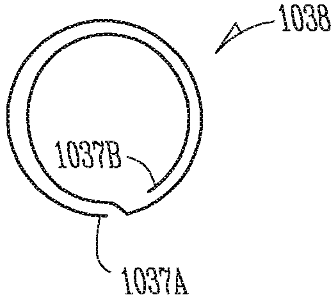
Figure 10C:
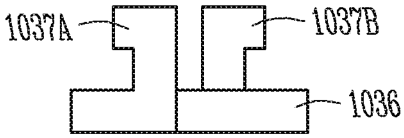

FIGS. 10A-10C illustrate an embodiment of a flex circuit for a multi-turn antenna. The illustrated embodiment includes an antenna portion 1036 and integrated flexible transmission lines 1037A-B. The length of the antenna portion is such that the antenna can be flexed to form two or more turns 1038, as illustrated in the top view of FIG. 10B and the side view of FIG. 10C. Current flows serially through the turns. Some embodiments coil the turns in the same plane, as illustrated in FIG. 10C, and some embodiments form a helix with the coils. The serially-connected turns improvise the receive voltage from the antenna. The illustrated loop 1038 has a general shape to wrap around width-wise either the inside or the outside surface of the outer shell of the hearing instrument. The loop can be configured to wrap length-wise around the device.

Figure 11A:
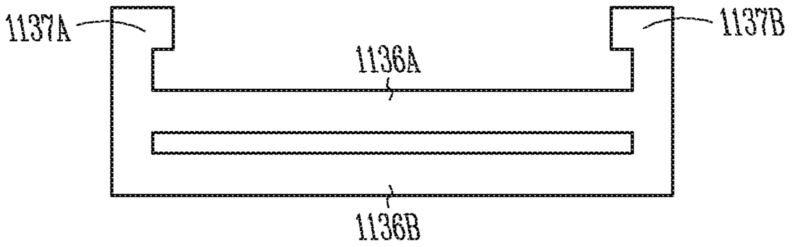
Figure 11B:
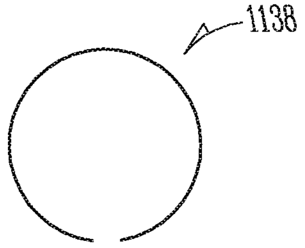
Figure 11C:
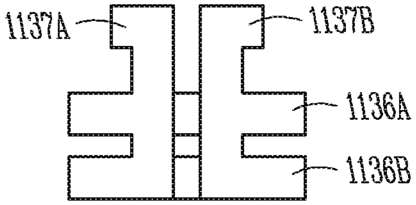

FIGS. 11A-11C illustrate an embodiment of a flex circuit for a multi-loop antenna. The illustrated embodiment includes antenna portions 1136A and 1136B connected in parallel between integrated flexible transmission lines 1137A-B. Each antenna portion forms a loop 1138 or substantially forms a loop, as illustrated in the top view of FIG. 11B and the side view of FIG. 11C. The parallel antenna portions reduce antenna loss in comparison to a single antenna portion. The illustrated loop 1138 has a general shape to wrap around width-wise either the inside or the outside surface of the outer shell of the hearing instrument. The loop can be configured to wrap length-wise around the device.

Figure 12A:
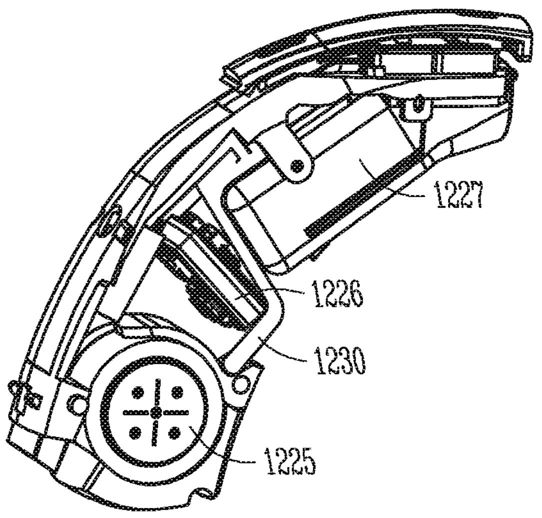
FIGS. 12A-12C illustrate an embodiment of an antenna that runs in a lengthwise direction of the device.
Figure 12B:
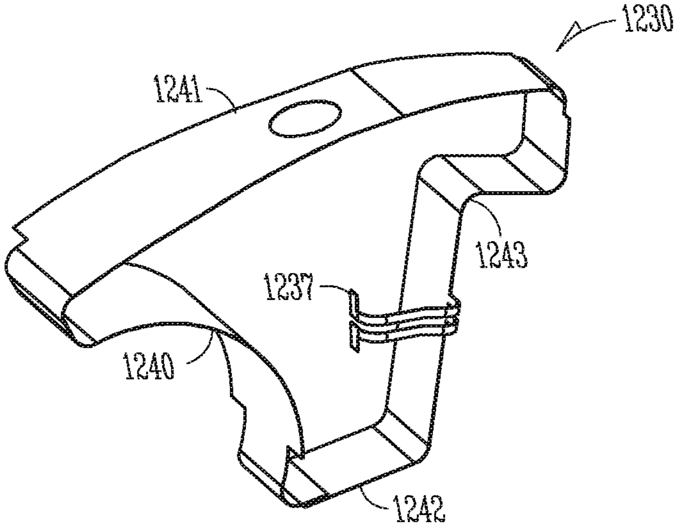
Figure 12C:
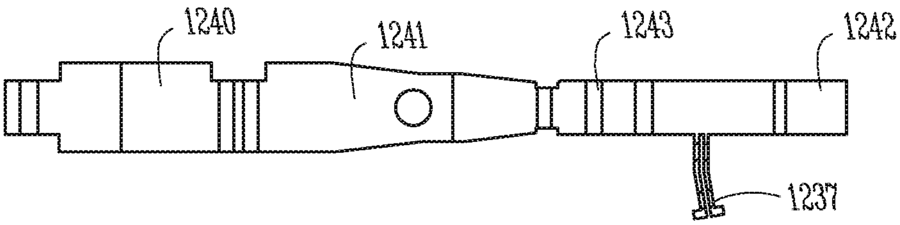

FIGS. 12A-12C illustrate an embodiment of an antenna that runs in a lengthwise direction of the device. An axis through the center of the aperture of the loop is substantially perpendicular to the lengthwise direction of the device. The illustrated device includes, among other things, an antenna 1230, a battery 1225, a radio circuit 1226 and a receiver (e.g. speaker) 1227. The radio circuit 1226 is the only illustrated electronic component within the loop aperture. The shape of the antenna includes a first side that is contoured to be complementary to a portion of the battery circumference, a second side that corresponds to a portion of a first side of the device, and a third side that corresponds to a portion of a second side of the device. A fourth side of the antenna is routed between the radio circuit 1226 and the receiver 1227 to prevent the receiver from being in the loop. The design balances the design goal of a larger loop aperture with the design goal of reducing loss from any magnetic and electrical components within the aperture. Also, the antenna design is symmetrical, allowing it to be used for devices for either left or right ears. Additionally, the bend of the antenna (e.g. the bend on the second side) improves the radiation pattern (polarization) for the antenna.

Figure 13A:
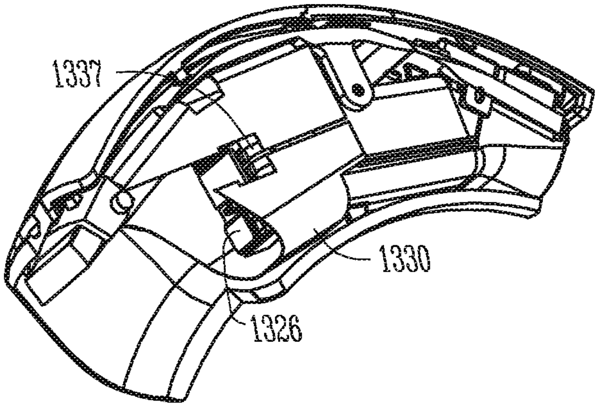
FIGS. 13A-13C illustrate an embodiment of an antenna that runs in a widthwise direction of the device.
Figure 13B:
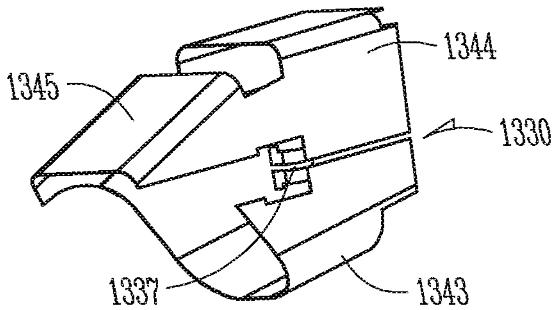
Figure 13C:
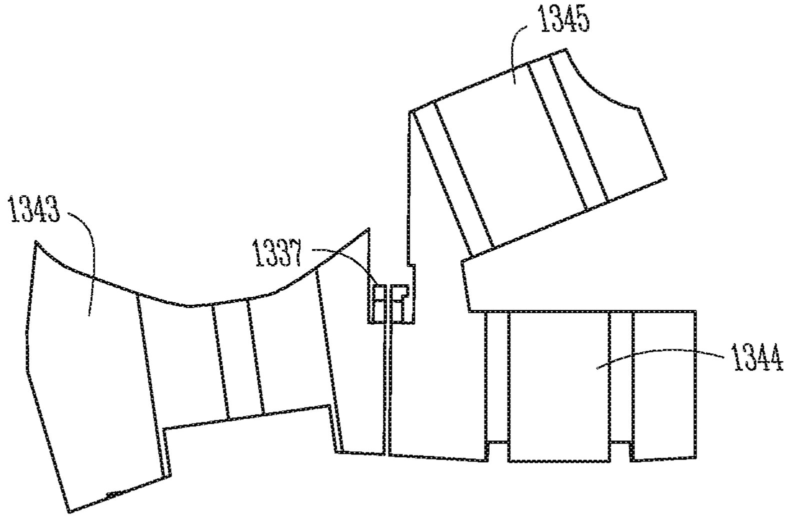
Figure 14A:
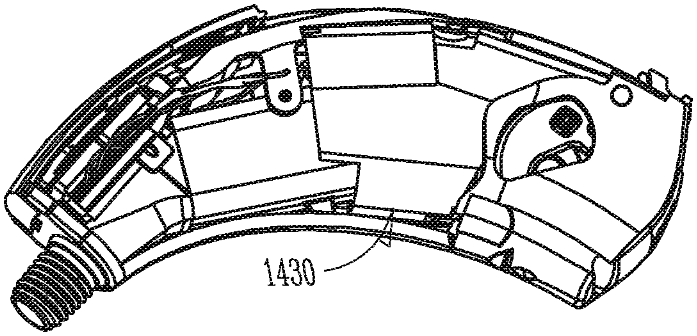
FIGS. 14A-14D illustrate an embodiment of an antenna that runs in a widthwise direction of the device.
Figure 14B:
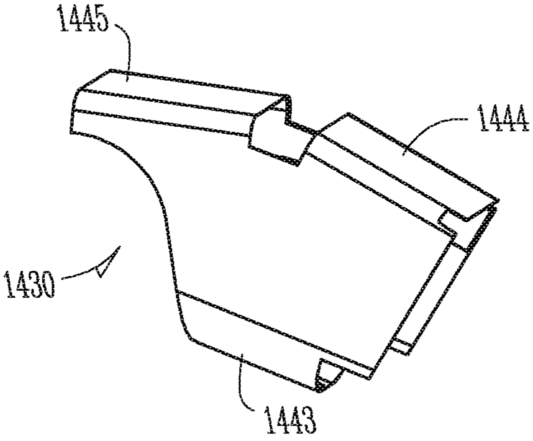
Figure 14C:
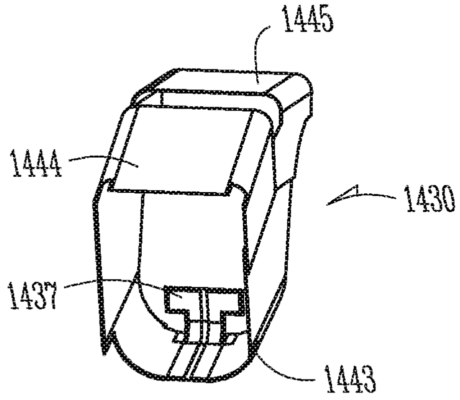
Figure 14D:
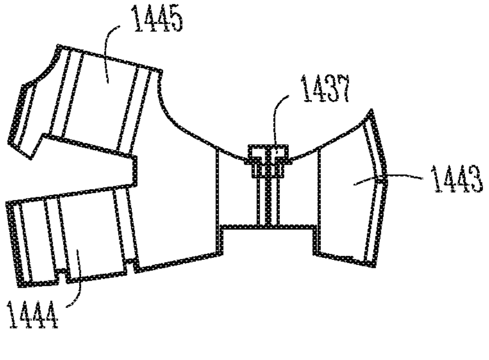

FIGS. 13A-13C illustrate an embodiment of an antenna that runs in a widthwise direction of the device. An axis through the center of the aperture of the loop is substantially parallel to a lengthwise direction of the device. The illustrated antenna 1330 includes a first portion 1343, a second portion 1344 and a third portion 1345. The second and third portions are electrically parallel. The design balances the design goal of a larger loop aperture with the design goal of reducing loss from any magnetic and electrical components within the aperture (e.g. the battery is not with an aperture formed between the first and second portions or an aperture formed between the first and third portions). Also, the antenna design is symmetrical, allowing it to be used for devices for either left or right ears. Additionally, the second and third portions of the antenna improves the radiation pattern (polarization) for the antenna. The aperture formed between the first and second portions has a center axis that is not parallel to the center axis of the aperture formed between the first and third portions. Integrally formed transmission lines 1337 are used to electrically connect the radio circuit to the antenna.

FIGS. 14A-14D illustrate an embodiment of an antenna that runs in a widthwise direction of the device. An axis through the center of the aperture of the loop is substantially parallel to a lengthwise direction of the device. The illustrated antenna 1430 includes a first portion 1443, a second portion 1444 and a third portion 1445. The second and third portions are electrically parallel. The design balances the design goal of a larger loop aperture with the design goal of reducing loss from any magnetic and electrical components within the aperture (e.g. the battery is not with the loop). Also, the antenna design is symmetrical, allowing it to be used for devices for either left or right ears. Additionally, the second and third portions of the antenna improves the radiation pattern (polarization) for the antenna. Integrally formed transmission lines 1437 are used to electrically connect the radio circuit to the antenna. These transmissions lines 1437 extend from the bottom of the antenna, rather than a side of the antenna, as was illustrated in FIGS. 13A-13C.

Some embodiments include an antenna that is completely within the outer shell of the device. Some embodiments include an antenna that has a portion on the outside surface of the outer shell, a portion on the inside surface of the outer shell, a portion within the walls of the outer shell, or various combinations thereof. Some embodiments include an antenna that is loops around the outside surface of the outer shell.

In various embodiments, the antenna design is modified to provide different geometries and electrical characteristics. For example, wider antennas or multiple loops electrically connected in parallel provide lower inductance and resistance than thinner or single antenna variations. In some embodiments the antennas include multiple loops electrically connected in series to increase the inductance and increase the effective aperture.

In some embodiments, the antenna is made using multifilar wire instead of a flex circuit to provide conductors electrically connected in series or parallel. Some embodiments use a metal shim for the antenna. Some embodiments use metal plating for the antenna. The metal plating may be formed inside of groove of the shell. The metal plating may be formed on an inside surface of the shell or an outside surface of the shell. An outside of an armature that is received within the shell may be plated.

The above detailed description is intended to be illustrative, and not restrictive. The scope of the invention should, therefore, be determined with reference to the appended claims, along with the full scope of equivalents to which such claims are legally entitled.

What is claimed is:

1. A hearing assistance device, comprising:
- a housing including an outer shell;
- a power source within the housing;
- a radio circuit within the housing and electrically connected to the power source;
- a flex antenna having an aperture oriented orthogonal to an axis of symmetry of the hearing assistance device, wherein the radio circuit is at least substantially within the aperture, wherein the power source is not within the aperture, and wherein ends of the flex antenna are physically connected and a portion of the flex antenna conforms to an inside surface of the outer shell; and
- a transmission line integrally formed with the flex antenna and configured to electrically connect to the radio circuit, wherein the housing includes a groove to receive at least a portion of the flex antenna.

2. The device of claim 1, wherein the radio circuit includes a hybrid radio circuit.

3. The device of claim 2, wherein the hybrid radio circuit includes a radio, an EPROM and a digital signal processor.

4. The device of claim 1, further comprising a microphone, a receiver, and signal processing circuitry connected to the flex antenna, the microphone and the receiver.

5. The device of claim 4, wherein the microphone and the receiver are not within the aperture of the flex antenna.

6. The device of claim 1, wherein the flex antenna includes a conductor layer between dielectric layers.

7. The device of claim 6, wherein the dielectric layers includes a polyimide material.

8. The device of claim 6, wherein the conductor layer includes copper.

9. The device of claim 1, wherein the flex antenna is symmetrical such that the flex antenna can be used for devices for either left or right ears of a wearer.

10. The device of claim 1, wherein the hearing assistance device includes a hearing aid.

11. The device of claim 10, wherein the hearing aid includes a behind-the-ear (BTE) hearing aid, an on-the-ear (OTE) hearing aid, an in-the-ear (ITE) hearing aid, or a completely-in-the-canal (CIC) hearing aid.

12. A method of forming a hearing assistance device, comprising:
- placing a radio circuit and a power source within a housing of the device, wherein the housing includes an outer shell;
- looping a flex antenna to form an aperture oriented orthogonal to an axis of symmetry of the hearing assistance device, wherein the radio circuit is at least substantially within the aperture, and wherein the power source is not within the aperture and a portion of the flex antenna conforms to an inside surface of the outer shell;
- placing at least a portion of the flex antenna into a groove in the housing;
- electrically connecting the flex antenna to the radio circuit using a transmission line integrally formed with the flex antenna; and
- physically connecting ends of the flex antenna.

13. The method of claim 12, further comprising electrically connecting the radio circuit to a receiver in the housing, wherein the receiver is not within the aperture.

14. The method of claim 12, further comprising electrically connecting the radio circuit to a microphone in the housing, the microphone configured to receive acoustic signals, wherein the microphone is not within the aperture.

15. The method of claim 14, further comprising electrically connecting the radio circuit to a signal processing unit including circuitry configured for processing signals received by the microphone.

16. The method of claim 15, wherein the signal processing unit is further configured to process signals received by the flex antenna.

17. The method of claim 12, wherein looping the flex antenna includes providing a first side of the flex antenna that is contoured to be complementary to a portion of a circumference of the power source.

18. The method of claim 17, wherein looping the flex antenna includes providing a second side of the flex antenna that is contoured to follow a first portion of the housing.

19. The method of claim 18, wherein looping the flex antenna includes providing a third side of the flex antenna that is contoured to follow a second portion of the housing.

20. The method of claim 12, wherein placing a radio circuit within a housing of the device includes placing a hybrid radio circuit within a housing of the device.

* * * * *